United States Patent [19]
Christofaro et al.

[11] Patent Number: 5,992,926
[45] Date of Patent: Nov. 30, 1999

[54] VEHICULAR SKID PLATE AND CROSS MEMBER ASSEMBLY

[75] Inventors: Paul A. Christofaro, Reading; Michael F. Miller, West Lawn, both of Pa.

[73] Assignee: Dana Corporation, Toledo, Ohio

[21] Appl. No.: 08/902,699

[22] Filed: Jul. 30, 1997

[51] Int. Cl.⁶ ................................. B62D 27/02
[52] U.S. Cl. ............. 296/204; 296/205; 296/29
[58] Field of Search .................. 296/204, 205, 296/29, 901; 180/69.1

[56] References Cited

U.S. PATENT DOCUMENTS

| | | |
|---|---|---|
| 925,783 | 6/1909 | Miller . |
| 1,868,382 | 7/1932 | Coadou ............................... 296/204 X |
| 2,851,302 | 9/1958 | Owen ..................................... 296/204 |
| 3,419,303 | 12/1968 | Eggert, Jr. et al. ..................... 296/204 |
| 3,596,976 | 8/1971 | Hablitzel ............................. 296/901 X |
| 3,940,176 | 2/1976 | Ito et al. . |
| 4,081,197 | 3/1978 | Ackel .................................... 296/204 |
| 4,402,545 | 9/1983 | Utsunomiya et al. .................. 296/204 |
| 4,491,362 | 1/1985 | Kennedy ............................. 296/901 X |
| 4,572,571 | 2/1986 | Malen ................................ 296/204 X |
| 4,604,327 | 8/1986 | de Smet . |
| 4,655,307 | 4/1987 | Lamoureux . |
| 4,865,378 | 9/1989 | Filtri et al. .......................... 296/204 X |
| 4,892,350 | 1/1990 | Kijima ..................................... 296/204 |
| 4,957,180 | 9/1990 | Lammers et al. . |
| 4,976,490 | 12/1990 | Gentle ................................. 296/901 X |
| 5,251,932 | 10/1993 | Ide . |
| 5,362,120 | 11/1994 | Cornille, JR. ......................... 296/29 X |
| 5,549,349 | 8/1996 | Corporon et al. .................. 296/204 X |

*Primary Examiner*—Joseph D. Pape
*Attorney, Agent, or Firm*—MacMillan, Sobanski & Todd, LLC

[57] ABSTRACT

A skid plate and cross member assembly for a vehicular frame includes a skid plate having a platform and a cross member having a body. A locking element, preferably having holes or slots, is formed in the body of the cross member. A moldable material in a moldable state is placed in a mold for the skid plate. The cross member is pressed into the moldable platform of the skid plate so that the locking element is immersed and the moldable material fills the voids of the locking element. After the moldable material has cured, the cross member is interlocked with the skid plate to form a lightweight skid plate and cross member assembly. This assembly is secured to side rails of a vehicular frame to protect lower components of a vehicle.

18 Claims, 5 Drawing Sheets

5,992,926

VEHICULAR SKID PLATE AND CROSS MEMBER ASSEMBLY

BACKGROUND OF THE INVENTION

This invention relates in general to vehicular frames, and in particular to a skid plate and cross member assembly and method for forming such an assembly.

A vehicular chassis generally includes a frame assembly, wheels, and other machinery of a vehicle, on which a body is supported. The frame assembly is oftentimes formed from a pair of longitudinally extending side rails, usually arranged substantially parallel to each other. One or more cross members can be attached transversely between the side rails to form a rigid structure. Suspension components such as struts and shock absorbers can be seated on the frame assembly, while wheels and axles can be mounted to and supported by the frame assembly. The body is secured to the frame assembly. The body usually includes a powertrain compartment, a passenger compartment, and a storage compartment.

In certain vehicles, it is common to secure a skid plate between side rails or any structural support members. The skid plate protects the body and lower components of a vehicle from rocks and other debris which may be present on a roadway. Also, the skid plate protects the body when a vehicle "bottoms out" on an uneven surface. Many skid plates include a cross member which is attached to the skid plate and the side rails. In some instances, such a cross member and/or the skid plate support a powertrain component such as a transmission.

In order to support mounted elements and perform in the harsh environment of a vehicular underbody, the frame assembly and skid plate must be formed from strong materials. To meet this requirement, many conventional side rails, cross members, and skid plates are formed from a metallic material such as steel.

In order to improve fuel economy, automobile manufacturers have implemented design changes to reduce the weight of many vehicle components, including those in a frame assembly. It is desirable to reduce the weight of a vehicular frame assembly and skid plate, thereby reducing the overall weight of a vehicle. Furthermore, it is desirable to simplify the assembly of a cross member onto a skid plate.

SUMMARY OF THE INVENTION

This invention includes a vehicular skid plate and cross member assembly. The assembly includes a skid plate formed from a composite material and a cross member formed from a metallic material. The assembly is mounted between and spans a pair of longitudinal side rails. The assembly has reduced weight when compared to equivalently-sized conventional skid plate and cross member assemblies formed completely from a metallic material such as steel. In a preferred embodiment, a skid plate and cross member assembly for a vehicular frame includes a skid plate having a platform and a cross member having a body. A locking element, preferably having holes or slots, is formed in the body of the cross member. A moldable material, preferably in a moldable state is placed into a mold for the skid plate. The cross member is pressed into the moldable material of the platform of the skid plate so that the locking element is immersed and the moldable material fills the voids of the locking element. After the moldable material has cured, the cross member is interlocked with the skid plate to form a lightweight skid plate and cross member assembly. This assembly is secured to side rails of a vehicular frame to protect lower components of a vehicle.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
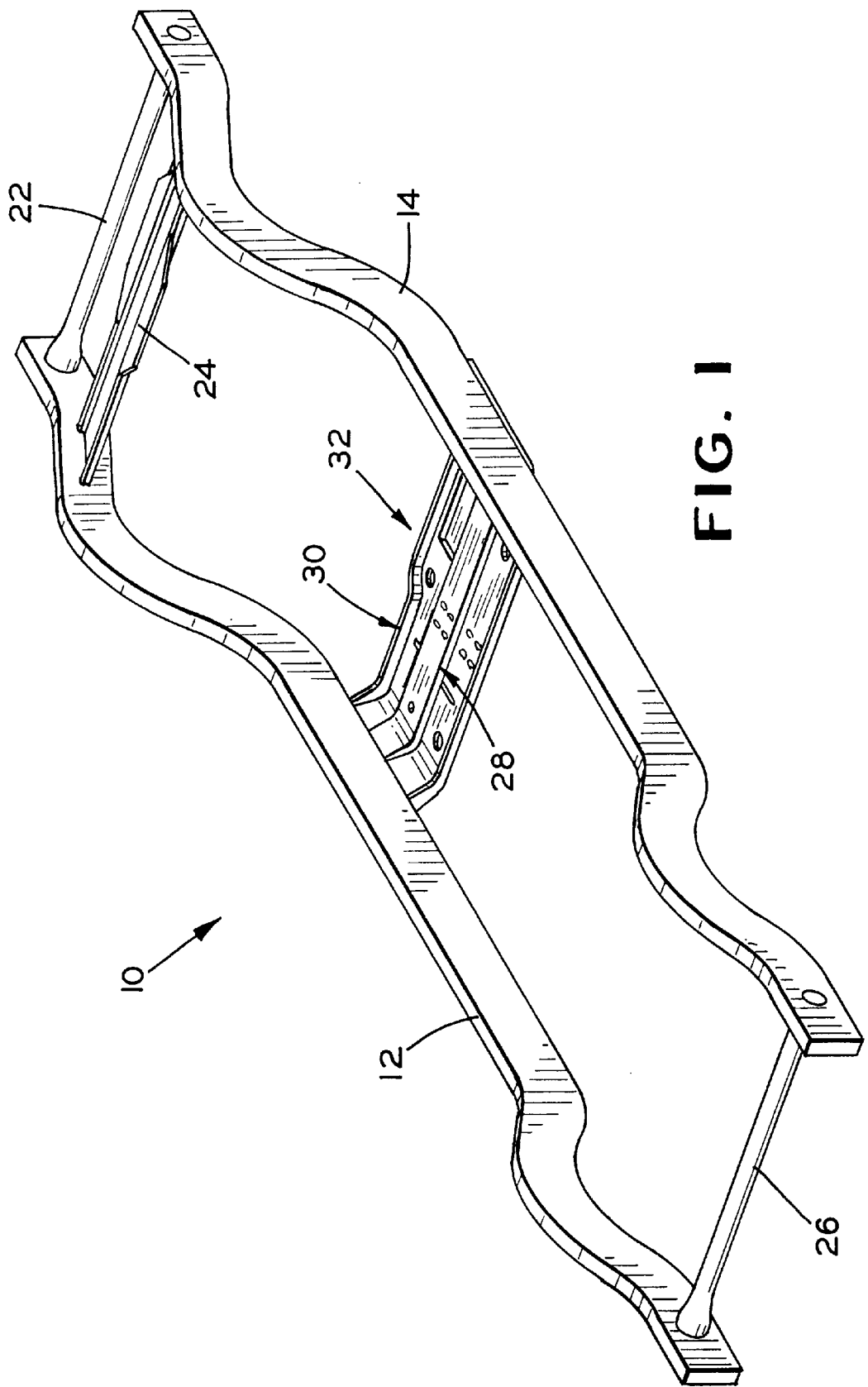
FIG. 1 is a perspective view of a vehicular frame assembly having a skid plate and cross member assembly according to this invention.

A vehicular frame assembly is indicated generally at 10 in FIG. 1. The frame assembly 10, also known as a ladder frame assembly, includes a pair of longitudinally extending side rails 12 and 14 which are oriented generally parallel to each other and span a substantial portion of the length of a vehicle (not illustrated).

The side rails 12 and 14 are joined together by a plurality of transversely extending cross members, two of which are indicated at 22 and 24 at or near the rear of the vehicle. A third cross member indicated at 26 is provided at or near a front of the vehicle. A fourth cross member 28 cooperates with a skid plate 30 and is mounted to the side rails 12 and 14 near the mid-portion of the vehicle. The cross members 22, 24, 26, and 28 connect the side rails 12 and 14 together and provide desirable lateral, vertical, and torsional stiffness to the frame assembly 10. The skid plate 30 acts as a protective shield from rocks and other debris for lower components of the vehicle and also joins the side rails 12 and 14 together. As described below, the fourth cross member 28 and the skid plate 30 are formed as a skid plate and cross member assembly 32 prior to mounting on the side rails 12 and 14. In other frame assemblies, the skid plate and cross member assembly 32 can be mounted at other positions along the length of the side rails 12 and 14.

The skid plate 30 is a generally rectangular member and is preferably formed from a strong, lightweight, and resilient material. It is desirable that the skid plate 30 be formed from a moldable material, and preferably from a fiber-reinforced moldable plastic material. A preferred material is a composite such as a fiber-reinforced vinyl ester or epoxy resin. Other moldable thermoset or thermoplastic materials can be used, but thermoset materials are preferred. Additionally, in certain applications, it is desirable that the skid plate 30 also be heat resistant due to the proximity of components an exhaust system of the vehicle, including mufflers and catalytic converters.

In some particular applications, the skid plate 30 may be required to support elements of a vehicle, such as a powertrain component. The selected material for the skid plate 30 must be capable of supporting the weight of any such components. Also, the skid plate 30 should have a resiliency enabling it to resume its original shape after impacts from road debris. For these reasons, the skid plate 30 is preferably a composite material, and should have a high flex strength, toughness, impact strength, and flex fatigue strength. Dimensional stability, and high tensile strength, modulus and corrosion resistance are also important.

Figure 2:
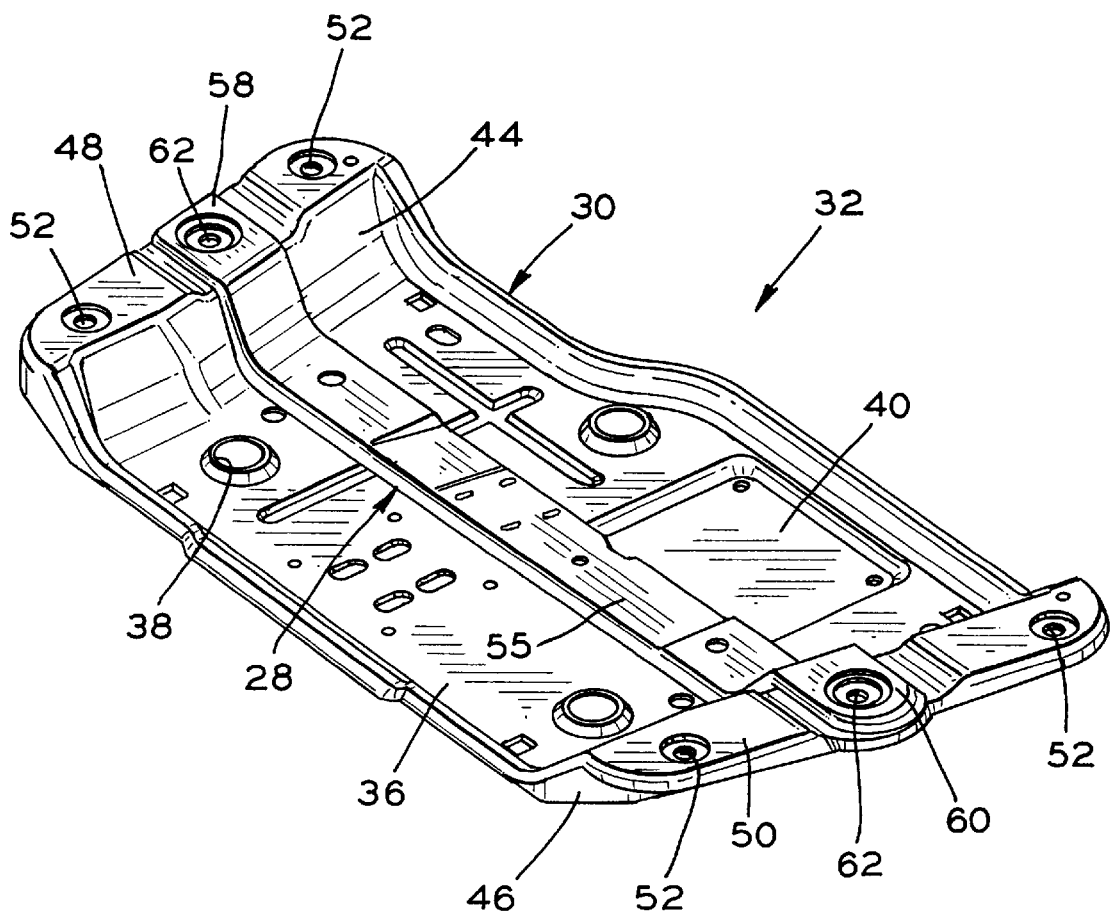
FIG. 2 is an enlarged perspective view of the skid plate and cross member assembly of FIG. 1 removed from longitudinal side rails for clarity of illustration.
Figure 3:
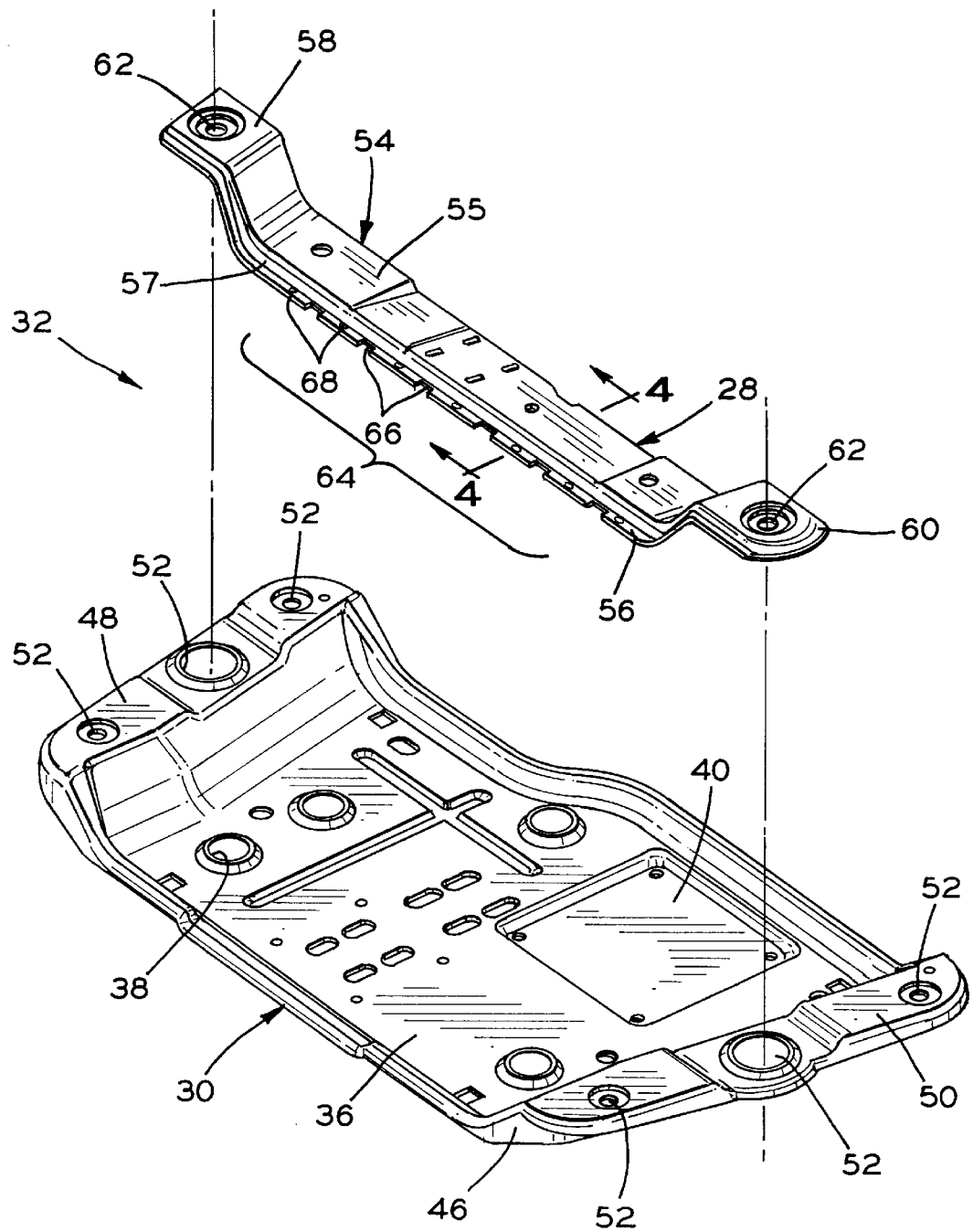
FIG. 3 is a perspective view similar to FIG. 2 wherein the cross member is exploded away from the skid plate to illustrate a locking element.

In the illustrated embodiment shown best in FIGS. 2 and 3, the skid plate 30 includes a substantially planar platform 36 formed with selective openings such as 38 to permit access to various components of the vehicle after the skid plate 30 is mounted to side rails 12 and 14. Other elements, such as depression 40, can be molded into the skid plate for mounting powertrain components and other equipment, not shown. Upwardly sloping side walls 44 and 46 terminate in substantially planar side ends 48 and 50, respectively. Openings 52 are formed through the side ends 48 and 50 to receive fasteners (not illustrated) such as bolts to secure the skid plate 30 to the side rails 12 and 14. In other embodiments, the skid plate 30 may be secured to the side rails 12 and 14 with rivets, adhesive, or any other desired means.

In one embodiment, the fourth cross member 28 is preferably formed from a strong metallic material such as steel. As described below, the cross member 28 is preferably joined to the skid plate 30 and then secured to the side rails 12 and 14. As illustrated best in FIG. 4, the cross member 28 has a body 54 having a hat-shaped cross-sectional profile formed by an upper substantially planar surface 55 connected to opposite substantially planar flanges 56 by side walls 57. The body 54 spans and rests on the platform 36 of the skid plate 30. Other shapes for the body 54 can also be used. The body 54 terminates in opposite substantially planar side ends 58 and 60. Openings 62 are formed through the side ends 58 and 60. When the cross member 28 is assembled with the skid plate 30, the side ends 58 and 60 of the cross member 28 are placed on the side ends 48 and 50 of the skid plate 30 so that openings 62 are aligned with openings 52. In this manner, fasteners may pass through both the skid plate 30 and cross member 28 to secure the skid plate and cross member assembly 32 to the side rails 12 and 14.

Figure 4:
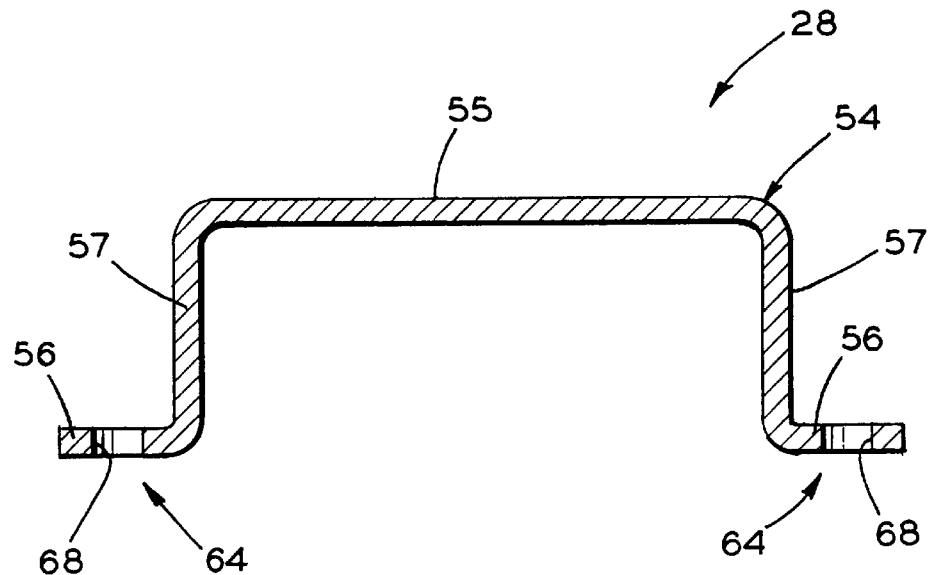
FIG. 4 is a greatly enlarged sectional view of the cross member taken along line 4—4 of FIG. 3.
Figure 5:
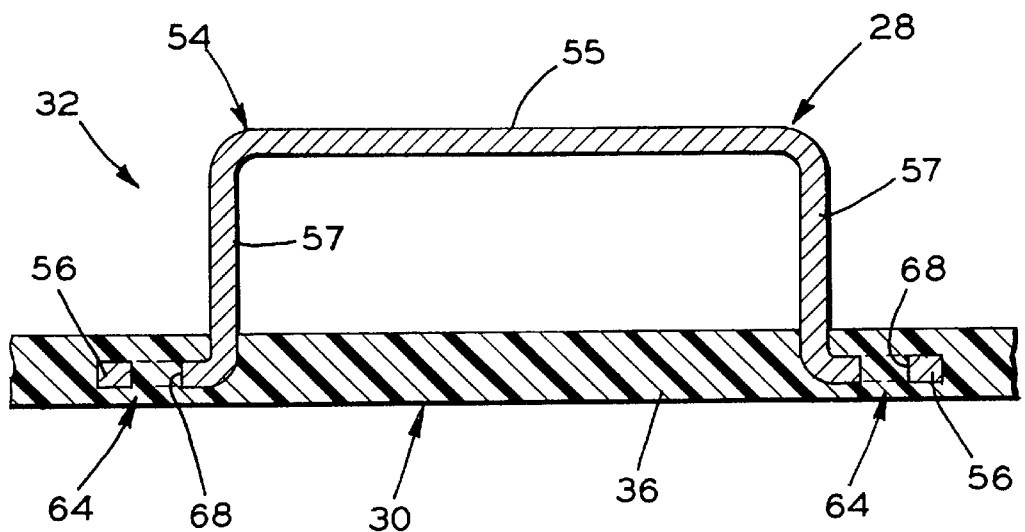
FIG. 5 is a greatly enlarged sectional view of the cross member and skid plate taken along line 5—5 of FIG. 2.

Preferably, a locking element 64 is integrally formed on the cross member 28. The locking element 64 is a portion of the cross member 28 that allows secure attachment of the cross member to the skid plate 30. The locking element 64 can be one or more (including a series of) slots 66 and/or holes 68 formed in the flanges 56 of the cross member 28. The locking element 64 can take the form of lower portion of the body 54, with holes 68 formed therein, as shown in FIG. 4. The slots 66 can also be placed in the flanges 56. As illustrated in FIG. 5, during the molding process the moldable composite material which eventually forms the skid plate 30, flows through the holes 68. After the curing of the molded material, the skid plate 30 is interlocked with the cross member 28, and therefore the cross member 28 is securely bonded to the skid plate 30. Although the holes 68 are shown in FIGS. 4 and 5, the slots 66, when present in the interlocking element 64, act in an equivalent manner. In other embodiments, the locking element can 64 be formed by other means and may use depressions or the like in place of the slots 66 or the holes 68. For example, a plurality of downwardly projecting vertical fingers, not shown, having spaces between them could be formed on the lower portion of the body 54. Material of the skid plate 30 can be received in the spaces and around the fingers to interlock the cross member 28 and the skid plate 30.

Figure 6:
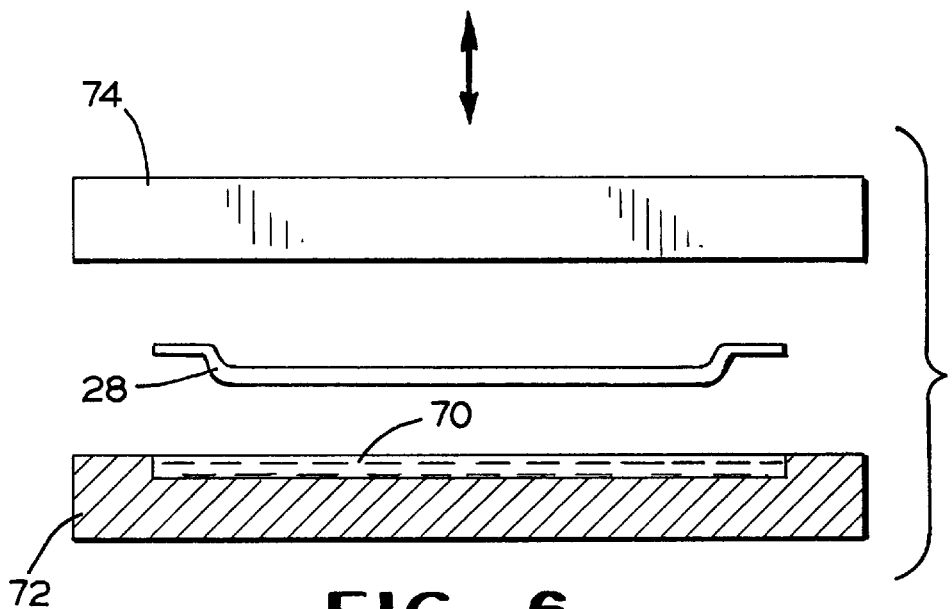
FIG. 6 is a schematic side elevation view of molding apparatus for molding a cross member assembly according to the method of the invention showing the mold after the mold is charged with moldable material.
Figure 7:
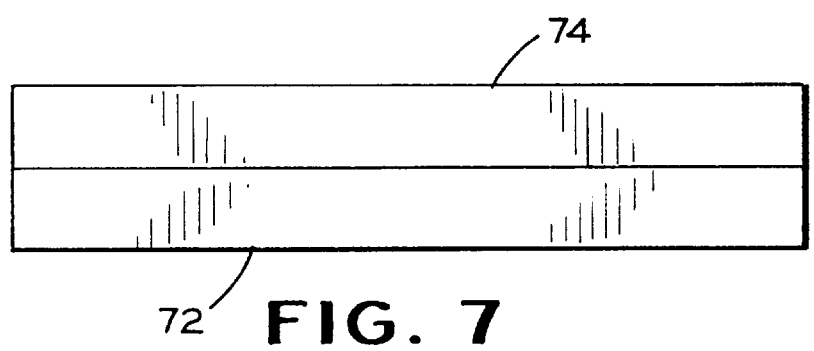
FIG. 7 is a view of the apparatus of FIG. 6, during the molding process.
Figure 8:
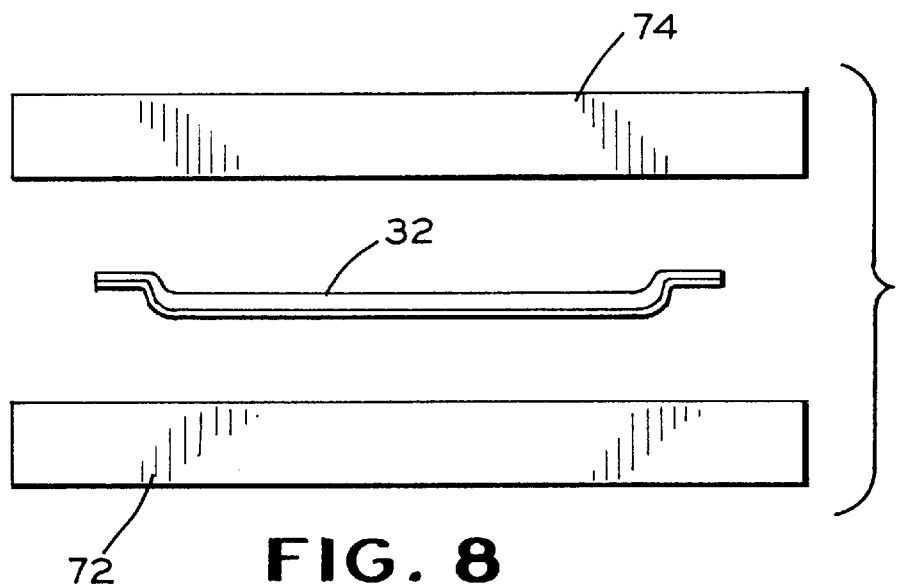
FIG. 8 is a view of the apparatus of FIG. 6, after the molding process.

As stated above, the skid plate 30 is preferably formed from a composite material, indicated in FIG. 6 at 70. In a preferred embodiment, the skid plate 30 is formed from a sheet molding compound which is placed in a semi-liquid or at least highly deformable or moldable state into a desired lower mold 72. While the composite is still in a liquid or deformable state, the upper mold 74 is lowered to press cross member 28 onto the deformable material for the skid plate 30, as shown in FIG. 7, so that the flanges 56 and locking element 64 are immersed in the moldable material. The deformable composite material flows through and fills in the slots 66 and holes 68. After the composite material is cured, typically under heat and pressure, the material solidifies to interlock the cross member 28 onto the skid plate 30 to form the skid plate and cross member assembly 32, as shown in FIG. 8. The assembly 32 can then be mounted onto the side rails 12 and 14 as described above. The cross member 28 provides added structural strength to the skid plate 30.

In another embodiment of the skid plate and cross member assembly 32, cross member 28 can be formed from a composite material rather than from steel to further reduce the weight of a frame assembly 10. The composite cross member 28 can be assembled with a composite skid plate 34 as described above. The composite cross member 28 is molded with a locking element 64. When solidified, the composite cross member 28 is pressed onto the still-deformable skid plate material so that the locking element 64 is immersed in the platform 36. After composite material from the platform 36 has filled the slots 66 and/or holes 68 of the locking member 64 and cured, the composite cross member 28 is interlocked with the composite skid plate 34 to form a lightweight skid plate and cross member assembly 32.

In yet another embodiment of the skid plate and cross member assembly 32, a composite cross member 28 can be molded integrally with the composite skid plate 30 in a single operation. A locking element 64 can be formed on either the cross member 28 or skid plate 30 to interlock the cross member 28 and skid plate 30 when the composite has cured.

In another embodiment of the assembly 32, the locking element 64 can be formed on a skid plate 34 and immersed into a still-deformable composite cross member 32.

If weight savings are not critical to a vehicular design, and/or where an intended use of a vehicle requires a material such as steel, the locking element 64 described above can be formed in either a metallic cross member 28 or skid plate 30 and immersed into a molten opposite element (cross plate or skid plate) so that molten steel fills a void of the locking element 64. After cooling, the steel solidified in the void of the locking element 64 interlocks the cross member 28 and the skid plate 30. Depending upon vehicle design parameters, other materials can be selected for the cross member 28 and the skid plate 30.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A skid plate and cross member assembly for a vehicle comprising:

a skid plate formed from a moldable material; and a cross member having a body and a locking element, a portion of the skid plate being molded to the locking element of the cross member to interlock the cross member and the skid plate.

2. The skid plate and cross member assembly defined in claim 1 wherein the locking element includes a slot.

3. The skid plate and cross member assembly defined in claim 3 wherein the moldable material from the skid plate fills the slot.

4. The skid plate and cross member assembly defined in claim 1 wherein the locking element includes a hole.

5. The skid plate and cross member assembly defined in claim 5 wherein the moldable material from the skid plate fills the hole.

6. The skid plate and cross member assembly defined in claim 1 wherein the skid plate is formed from a composite material.

7. A vehicular frame assembly comprising:

first and second side rails; and a skid plate and cross member assembly attached to the side rails, the skid plate and cross member assembly including a skid plate formed from a moldable material, a cross member, and a locking element formed on one of the skid plate or cross member, a portion of the skid plate being molded to the locking element to interlock the skid plate and the cross member.

8. The vehicular frame assembly defined in claim 7 wherein moldable material of the skid plate is received in a hole in the locking element to interlock the skid plate and the cross member.

9. The vehicular frame assembly defined in claim 7 wherein the locking element includes a slot formed on a body of the cross member.

10. The vehicular frame assembly defined in claim 7 wherein the locking element includes an opening formed on a body of the cross member.

11. The vehicular frame assembly defined in claim 7 wherein the skid plate is formed from a composite material.

12. A vehicular frame assembly comprising:

first and second side rails; and a skid plate and cross member assembly attached to the side rails, the skid plate and cross member assembly including a skid plate and a cross member interlocked together, wherein the skid plate and the cross member are made of different materials, and wherein the skid plate is formed from a moldable material including a portion that is molded to a portion of the cross member.

13. The vehicular frame assembly defined in claim 12 in which the skid plate is a molded composite and the cross member is metallic.

14. The vehicular frame assembly defined in claim 13 including a locking element formed on one of the skid plate or cross member and interlocking the skid plate and cross member.

15. The vehicular frame assembly defined in claim 14 wherein moldable material of the skid plate is received in a hole in the locking element to interlock the skid plate and the cross member.

16. The vehicular frame assembly defined in claim 14 in which the skid plate and the cross member are molded composites.

17. The vehicular frame assembly defined in claim 16 including a locking element formed on one of the skid plate or cross member and interlocking the skid plate and cross member.

18. The vehicular frame assembly defined in claim 17 wherein moldable material of the skid plate is received in a hole in the locking element to interlock the skid plate and the cross member.

* * * * *

UNITED STATES PATENT AND TRADEMARK OFFICE
CERTIFICATE OF CORRECTION

PATENT NO. : 5,992,926
DATED : November 30, 1999
INVENTOR(S) : Paul A. Christofaro, et al.

It is certified that error appears in the above-identified patent and that said Letters Patent is hereby corrected as shown below:

Claim 3, line 2, change "3" to --2--.

Claim 16, line 1, change "14" to --12--.

Signed and Sealed this

Twenty-third Day of May, 2000

Attest:

Q. TODD DICKINSON

*Attesting Officer*  *Director of Patents and Trademarks*